(12) United States Patent
Park et al.

(10) Patent No.: US 11,958,750 B2
(45) Date of Patent: Apr. 16, 2024

(54) LITHIUM-DOPED SILICON-BASED OXIDE NEGATIVE ELECTRODE ACTIVE MATERIAL, METHOD OF PREPARING THE SAME, AND NEGATIVE ELECTRODE AND SECONDARY BATTERY INCLUDING THE SAME

(71) Applicant: SK On Co., Ltd., Seoul (KR)

(72) Inventors: Eunjun Park, Daejeon (KR); Joon-Sup Kim, Daejeon (KR); Gwi Ok Park, Daejeon (KR); Jeongbae Yoon, Daejeon (KR); Suk Chin Lee, Daejeon (KR); Hansu Kim, Seoul (KR); Donghan Youn, Namyangju-si (KR); Dong Jae Chung, Seoul (KR)

(73) Assignee: SK On Co., Ltd., Seoul (KR)

( * ) Notice: Subject to any disclaimer, the term of this patent is extended or adjusted under 35 U.S.C. 154(b) by 320 days.

(21) Appl. No.: 17/325,294

(22) Filed: May 20, 2021

(65) Prior Publication Data

US 2021/0363020 A1  Nov. 25, 2021

(30) Foreign Application Priority Data

May 21, 2020 (KR) .................... 10-2020-0060810

(51) Int. Cl.
*C01B 33/24* (2006.01)
*H01M 10/0525* (2010.01)

(52) U.S. Cl.
CPC ......... *C01B 33/24* (2013.01); *H01M 10/0525* (2013.01); *C01P 2002/74* (2013.01); *C01P 2002/82* (2013.01)

(58) Field of Classification Search
CPC .................................................... H01M 4/134
See application file for complete search history.

(56) References Cited

U.S. PATENT DOCUMENTS 9,419,276 B2   8/2016  Lee et al.
10,497,934 B2  12/2019  Park et al.
(Continued)

FOREIGN PATENT DOCUMENTS

JP   2013161705 A   8/2013
JP   2014220216 A  11/2014
(Continued)

OTHER PUBLICATIONS

Veluchamy et al., "Improvement of cycle behavior of SiO/C anode composite by thermochemically generated Li4SiO4 inert phase for lithium batteries", Journal of Power Sources, 2009, pp. 574-577, vol. 188.

*Primary Examiner* — Nathanael T Zemui
(74) *Attorney, Agent, or Firm* — The Webb Law Firm (57) ABSTRACT

Provided are a negative electrode active material which includes negative electrode active material particles which includes a silicon oxide ($SiO_x$, $0<x\leq2$); and at least one lithium silicate selected from $Li_2SiO_3$, $Li_2Si_2O_5$, and $Li_4SiO_4$ in at least a part of the silicon oxide. The negative electrode active material particles have a maximum peak position by a Raman spectrum of more than 460 $cm^{-1}$ and less than 500 $cm^{-1}$. Also provided are a method of preparing the same, and a negative electrode and a lithium secondary battery including the negative electrode active material.

15 Claims, 2 Drawing Sheets

(56) References Cited

U.S. PATENT DOCUMENTS

| | | |
|---|---|---|
| 10,950,852 B2 | 3/2021 | Hayashida et al. |
| 2015/0380735 A1 | 12/2015 | Tuduki et al. |
| 2019/0123344 A1 | 4/2019 | Hirose et al. |
| 2019/0305305 A1 | 10/2019 | Ohsawa et al. |
| 2021/0151742 A1* | 5/2021 | Kim ........................ C01B 32/05 |
| 2022/0013770 A1* | 1/2022 | Hirose .................. H01M 4/485 |

FOREIGN PATENT DOCUMENTS

| | | | |
|---|---|---|---|
| JP | 2017152393 A | 8/2017 | |
| JP | 2019175654 A | 10/2019 | |
| KR | 1020140070482 A | 6/2014 | |
| KR | 1020170048184 A | 5/2017 | |
| KR | 1020190116011 A | 10/2019 | |
| WO | 2016098206 A1 | 6/2016 | |
| WO | 2018179970 A1 | 10/2018 | |
| WO | 2020110625 A1 | 6/2020 | |

* cited by examiner

LITHIUM-DOPED SILICON-BASED OXIDE NEGATIVE ELECTRODE ACTIVE MATERIAL, METHOD OF PREPARING THE SAME, AND NEGATIVE ELECTRODE AND SECONDARY BATTERY INCLUDING THE SAME

CROSS-REFERENCE TO RELATED APPLICATION

This application claims priority to Korean Patent Application No. 10-2020-0060810 filed May 21, 2020, the disclosure of which is hereby incorporated by reference in its entirety.

BACKGROUND OF THE INVENTION

Field of the Invention

The following disclosure relates to a lithium-doped silicon-based oxide negative electrode active material, a method of preparing the same, and a negative electrode and a lithium secondary battery including the same.

Description of Related Art

As an issue of global warming which is a problem in modern society arises, a demand for environmentally friendly technologies is rapidly increasing in response thereto. In particular, as a technical demand for electric vehicles and energy storage systems (ESS) increases, a demand for a lithium secondary battery in the spotlight as an energy storage device is exploding. Therefore, studies to improve energy density of the lithium secondary battery are in progress.

However, conventional commercialized secondary batteries commonly use a graphite active material such as natural graphite and artificial graphite, but has a low energy density due to the low theoretical capacity of the graphite, and thus, studies to improve the energy density by developing a new negative electrode material are in progress.

As a solution thereto, a Si-based material having a high theoretical capacity (3580 mAh/g) is emerging as one solution. However, the Si-based material as such has a disadvantage of a deteriorated battery life characteristic due to large volume expansion (~400%) in the course of repeated charge and discharge. Thus, as a method of solving the issue of large volume expansion of the Si material, a $SiO_x$ material which has a low volume expansion rate as compared with Si has been developed. Though $SiO_x$ material shows an excellent life characteristic due to the low volume expansion rate, it is difficult to apply the $SiO_x$ material to a lithium secondary battery in practice due to the unique low initial coulombic efficiency (ICE) by initial formation of an irreversible phase.

SUMMARY OF THE INVENTION

An embodiment of the present invention is directed to improving a problem of deterioration of battery stability and a life characteristic due to expansion of silicon-based oxide particles caused by use of the silicon-based oxide as a negative electrode active material, by controlling crystallinity of the silicon-based oxide.

Another embodiment of the present invention is directed to improving a problem of deterioration of initial efficiency by formation of an irreversible phase during initial charge and discharge of a battery of the silicon-based oxide, by introducing a Li pretreatment process.

Another embodiment of the present invention is directed to improving a problem requiring more optimization by initial efficiency improvement of a silicon-based compound by Li pretreatment (specifically, (1) energy costs during Li pretreatment, and (2) a problem of optimizing a capacity characteristic by adjusting a ratio between a specific reversible phase and a specific irreversible phase in a lithium silicate formed), by performing the Li pretreatment under specific conditions.

Still another embodiment of the present invention is directed to improving a problem of an increase in crystallinity of a silicon-based oxide (increase in a c-Si/a-Si ratio) corresponding to improvement of the initial efficiency problem of the silicon oxide by the Li pretreatment, by preparing a raw material of a silicon oxide under specific conditions and performing the Li pretreatment process under specific conditions.

In one general aspect, a negative electrode active material includes: negative electrode active material particles including: a silicon oxide ($SiO_x$, $0<x\leq2$); and at least one lithium silicate selected from $Li_2SiO_3$, $Li_2Si_2O_5$, and $Li_4SiO_4$ in at least a part of the silicon oxide, wherein the negative electrode active material particles have a maximum peak position by a Raman spectrum of more than 460 $cm^{-1}$ and less than 500 $cm^{-1}$.

The negative electrode active material particles may have a maximum peak position by the Raman spectrum of 480 $cm^{-1}$ or less.

The negative electrode active material particles may have a peak intensity ratio Ia/Ib by the Raman spectrum of 1.20 or less (Ia is a peak intensity of $515\pm15$ $cm^{-1}$ and Ib is a peak intensity of $470\pm30$ $cm^{-1}$ in the Raman spectrum).

The peak intensity ratio Ia/Ib by the Raman spectrum may be 0.4 or less.

The negative electrode active material particles may include 10 to 100 wt % of the lithium silicate with respect to a total weight.

The negative electrode active material particles may have a peak area ratio D/E according to an X-ray diffraction analysis method of less than 5.54 (D is an area of a $Li_2Si_2O_5$ peak positioned at $24.9\pm0.3°$, and E is an area of a $Li_2SiO_3$ peak positioned at $26.9\pm0.3°$ in X-ray diffraction analysis).

The negative electrode active material particles may have a peak area ratio C/D according to the X-ray diffraction analysis method of less than 45.99 (C is an area of a Si peak positioned at $28.4\pm0.3°$, and D is an area of a $Li_2Si_2O_5$ peak positioned at $24.9\pm0.3°$ in the X-ray diffraction analysis).

The negative electrode active material particles may have a peak area ratio C/E according to the X-ray diffraction analysis method of less than 8.75 (C is an area of a Si peak positioned at $28.4\pm0.3°$, and E is an area of a $Li_2SiO_3$ peak positioned at $26.9\pm0.3°$ in the X-ray diffraction analysis).

The negative electrode active material particles may have a peak area ratio C/E according to X-ray diffraction analysis of less than 1.1.

The negative electrode active material particles may include substantially no $Li_4SiO_4$.

The negative electrode active material may include 50 wt % or more of the negative electrode active material particles with respect to the total weight.

In another general aspect, a method of preparing a negative electrode active material includes: preparing silicon compound particles including a silicon compound; and mixing the silicon compound particles and a Li precursor and performing heat treatment to prepare negative electrode active material particles including: a silicon oxide ($SiO_x$, $0<x\leq 2$) and at least one lithium silicate selected from $Li_2SiO_3$, $Li_2Si_2O_5$, and $Li_4SiO_4$ in at least a part of the silicon oxide, wherein the negative electrode active material particles have a maximum peak position by a Raman spectrum of more than 460 $cm^{-1}$ and less than 500 $cm^{-1}$.

In another general aspect, a negative electrode includes: a negative electrode layer including the negative electrode active material and a water-based binder.

In still another general aspect, a lithium secondary battery includes: the negative electrode; a positive electrode; a separator positioned between the negative electrode and the positive electrode; and an electrolyte.

Other features and aspects will be apparent from the following detailed description, the drawings, and the claims.

DESCRIPTION OF THE INVENTION

Advantages and features of the present invention and methods to achieve them will be elucidated from exemplary embodiments described below in detail with reference to the accompanying drawings. However, the present invention is not limited to exemplary embodiments disclosed below, but will be implemented in various forms. The exemplary embodiments of the present invention make disclosure of the present invention thorough and are provided so that those skilled in the art can easily understand the scope of the present invention. Therefore, the present invention will be defined by the scope of the appended claims. Detailed description for carrying out the present invention will be provided with reference to the accompanying drawings below. Regardless of the drawings, the same reference number indicates the same constitutional element, and "and/or" includes each of and all combinations of one or more of mentioned items.

Unless otherwise defined herein, all terms used in the specification (including technical and scientific terms) may have the meaning that is commonly understood by those skilled in the art. Throughout the present specification, unless explicitly described to the contrary, "comprising" any elements will be understood to imply further inclusion of other elements rather than the exclusion of any other elements. In addition, unless explicitly described to the contrary, a singular form includes a plural form herein.

In the present specification, it will be understood that when an element such as a layer, film, region, or substrate is referred to as being "on" or "above" another element, it can be directly on the other element or intervening elements may also be present.

An embodiment of the present invention provides a negative electrode active material. The negative electrode active material includes: negative electrode active material particles including: a silicon oxide ($SiO_x$, $0<x\leq 2$); and at least one lithium silicate selected from $Li_2SiO_3$, $Li_2Si_2O_5$, and $Li_4SiO_4$ in at least a part of the silicon oxide, wherein the negative electrode active material particles have a maximum peak position by a Raman spectrum of more than 460 $cm^{-1}$ and less than 500 $cm^{-1}$.

Since the negative electrode active material includes the negative electrode active material particles including the silicon oxide, a battery capacity may be improved. In addition, the lithium silicate may suppress initial formation of an irreversible phase of the silicon oxide during initial charge and discharge.

The negative electrode active material particles have the maximum peak position by the Raman spectrum of preferably more than 460 $cm^{-1}$ and less than 500 $cm^{-1}$, preferably 490 $cm^{-1}$ or less, and more preferably 480 $cm^{-1}$ or less. It is known that as the maximum peak position is increased in a range of 500 to 520 $cm^{-1}$, the growth of crystalline Si (hereinafter, referred to as c-Si) is promoted as compared with non-crystalline Si (hereinafter, referred to as a-Si) to prepare a silicon oxide having a high ratio of c-Si/a-Si. In general, it is analyzed that the silicon oxide prior to the lithium pretreatment has the maximum peak position of 480±15 $cm^{-1}$ in the case of an amorphous silicon. When the lithium pretreatment is performed, the crystallinity of silicon is increased, and thus, the maximum peak position deviates from 480±15 $cm^{-1}$, and as the ratio of the crystalline silicon is increased, increase rate of maximum peak position shift is high, and preferably when the non-crystalline (amorphous) silicon is mainly included, the maximum peak may be formed at 480±15 $cm^{-1}$ or less.

Meanwhile, the material being crystalline means that the shape of single Si positioned inside the particle is crystalline, and the material being amorphous means that the shape of single Si positioned inside the particle is amorphous or fine particles which are so small that it is difficult to measure the size by Scherrer's equation among XRD analysis methods, but which does not mean that the lithium silicate is amorphous or fine particles.

More specifically, the negative electrode active material particles may have a peak intensity ratio Ia/Ib by the Raman spectrum of 1.20 or less, preferably 0.5 or less, more preferably 0.4 or less, and most preferably 0.35 or less. Thus, a discharge capacity and a life characteristic may be further improved. Meanwhile, Ia may be a peak intensity at 515±15 $cm^{-1}$ and Ib is a peak intensity at 470±30 $cm^{-1}$ in the Raman spectrum, and the Ia peak intensity may be an indicator of the formation of c-Si and the Ib peak intensity may be an indicator of the formation of a-Si.

The negative electrode active material particles may include 10 to 100 wt % of the lithium silicate, and specifically they include preferably 10 wt % or more and less than 100 wt %, 10 to 90 wt %, 30 to 90 wt %, or 50 to 90 wt % of the lithium silicate, with respect to the total weight, in at least a part of the particles.

In addition, in order to achieve the above object, it is preferred that the negative electrode active material particles satisfy the relation of a peak area ratio D/E according to an X-ray diffraction analysis method of less than 5.54. Specifically, the peak area ratio D/E may be 4 or less or 3 or less, preferably 2.5 or less, 2.3 or less, or 2 or less, more preferably 1.5 or less, 1.0 or less, or 0.55 or less, and most preferably 0.4 or less, 0.3 or less, 0.1 or less, or 0.08 or less. The lower limit of the peak area ratio D/E is not particularly limited, but may be 0.00 or more, or 0.01 or more.

D is an area of a $Li_2Si_2O_5$ peak positioned at 24.9±0.3° in the X-ray diffraction analysis. When the peak area ratio D/E is within the range, a smaller amount of Si is consumed in forming a phase of $Li_2SiO_3$ than in forming a phase of the lithium silicate such as $Li_2Si_2O_5$, whereby a capacity characteristic may be improved and a severe volume change of Si during cycles is mitigated so that it is advantageous for improvement of a life characteristic. Meanwhile, a $Li_4SiO_4$ phase has a high moisture content and high reactivity so that it is difficult to adjust the physical properties of slurry in the manufacture of an electrode, which is thus, not preferred.

Here, further, the negative electrode active material particles may have the peak area ratio C/D according to the X-ray diffraction analysis method of less than 45.99, specifically, 40 or less or 35 or less, preferably 30 or less, 25 or less, or 20 or less, more preferably 15 or less, 12 or less, or 10 or less, and most preferably 9.5 or less, 9 or less, 8.5 or less, or 8.4 or less. The lower limit of the peak area ratio C/D is not particularly limited, but may be 0.00 or more, or 0.3 or more.

C is an area of a Si peak positioned at 28.4±0.3° in the X-ray diffraction analysis and D is an area of a $Li_2Si_2O_5$ peak positioned at 24.9±0.3° in the X-ray diffraction analysis.

In addition, the negative electrode active material particles may satisfy the relation of the peak area ratio C/E of less than 8.75, specifically less than 1.35 or 1.09 or less in the X-ray diffraction analysis method. The lower limit of the peak area ratio C/E is not particularly limited, but may be 0.0 or more, or 0.2 or more.

C is an area of a Si peak positioned at 28.4±0.3° in the X-ray area of analysis and D is an area of a $Li_2Si_2O_3$ peak positioned at 26.9±0.3° in the X-ray diffraction analysis. When the peak area ratio C/E is within the range, $Li_2SiO_3$ may be increased while the growth of c-Si of the negative electrode active material particles is suppressed, which is thus, preferred.

In addition, it is more preferred that the negative electrode active material particles include substantially no $Li_4SiO_4$. Since the $Li_4SiO_4$ phase has an irreversible property to a Li ion and is vulnerable to moisture, it is not preferred as an active material of a negative electrode using a water-based binder, and for preparing a stable slurry, a content of the $Li_4SiO_4$ phase is less than 35 wt % with respect to the total weight of the negative electrode active material particles, and it is preferred that substantially no $Li_4SiO_4$ phase is included. Thus, water resistance of the negative electrode active material may be improved.

The negative electrode active material particles may be included at 50 wt % or more, preferably 60 wt % or more or 70 wt % or more, more preferably 80 wt % or more or 90 wt % or more, and as an example, 100 wt % with respect to the total weight of the negative electrode active material. Conventionally, when only silicon oxide particles were used as the negative electrode active material, an excellent life characteristic was not able to be implemented due to electrode volume expansion, and thus, a graphite-based active material or the like which may mitigate contraction/expansion of the silicon oxide-based particles was mixed therein in an amount of more than half and used. Since the Li pretreatment of the silicon oxide particles may suppress production of crystalline c-Si and increase a ratio of a-Si, the present invention may provide the negative electrode active material by including negative electrode active material particles including the silicon oxide and $Li_2SiO_3$ at a high content. Thus, initial efficiency and a life characteristic may be improved as compared with the conventional technology and, simultaneously, a discharge capacity may be further improved.

The negative electrode active material particles may have an average particle size of less than 30 μm and more than 2 μm, preferably less than 10 μm and more than 7 μm, and within the range, volume expansion of the negative electrode active material particles during intercalation/deintercalation of a Li ion may be decreased to suppress electrode deterioration.

The average particle size of the negative electrode active material particles may refer to D50, and D50 refers to a diameter of a particle with a cumulative volume of 50% when cumulated from the smallest particle in measurement of a particle size distribution by a laser scattering method. Here, for D50, the particle size distribution may be measured by collecting a sample for the prepared carbonaceous material according to a KS A ISO 13320-1 standard and using Mastersizer 3000 from Malvern Panalytical Ltd. Specifically, after particles are dispersed in ethanol as a solvent, if necessary, using an ultrasonic disperser, a volume density may be measured.

Another embodiment of the present invention provides a method of preparing the negative electrode active material. The negative electrode active material is characterized by having a maximum peak position by a Raman spectrum of more than 460 $cm^{-1}$ and less than 500 $cm^{-1}$, and a preparation method thereof includes: preparing silicon compound particles; and mixing the silicon compound particles and a Li precursor and performing heat treatment to prepare negative electrode active material particles including a silicon oxide ($SiO_x$, $0<x\leq 2$) and at least one lithium silicate selected from $Li_2SiO_3$, $Li_2Si_2O_5$, and $Li_4SiO_4$ in at least a part of the silicon oxide.

First, in preparing the silicon compound particles, raw material powder is mixed and heat treatment is performed to prepare the silicon compound particles. Mixing the raw material powder may be mixing by appropriately adjusting a mixing ratio of Si powder and $SiO_2$ powder so that a mole ratio of Si and O of the prepared silicon compound particles ($SiO_x$, $0<x\leq 2$) is formed, but the present invention is not limited thereto. Subsequently, the mixed raw material powder may be placed in a furnace under an inert atmosphere, and subjected to heat treatment at a temperature of lower than 900° C., preferably lower than 800° C., or 500 to 700° C., and more preferably 500 to 650° C. for 1 to 12 hours or 1 to 8 hours under reduced pressure. Conventionally, in order to prepare the silicon compound particles, the heat treatment was performed at a high temperature of 900 to 1600° C., but in the case of a $SiO_x$ material or a SiO material, a c-Si seed grows at a heat treatment temperature of 800° C. or higher and a crystallite grows clearly at about 900° C., and thus, in the present invention, formation of the c-Si seed and the growth of c-Si is suppressed to prepare an amorphous or microcrystalline silicon-based compound.

The prepared silicon compound may be extracted, pulverized, and powdered to prepare the silicon compound particles.

In addition, a carbon layer may be further formed on a surface of the prepared silicon compound particles, and in this case, hydrocarbon gas is introduced into the furnace and heating may be performed at a temperature lower than a heat treatment temperature in the preparation of the silicon compound. Specifically, the heat treatment may be performed at a temperature of lower than 800° C. or a temperature of 500 to 700° C., more preferably a temperature of 500 to 650° C. for 1 to 12 hours or 1 to 8 hours, under reduced pressure or inert gas. Conventionally, the heat treatment was performed at a relatively higher temperature of 800 to 1200° C. or 800 to 950° C. for coating a carbon material of the surface of the silicon compound particles, but in this case, a disproportionation reaction of the silicon compound is accelerated by the additional heat treatment to divide the region into Si and $SiO_x$ (0<x≤2) or $SiO_2$ region, and it is analyzed that in the silicon compound material, the growth of c-Si is promoted at a temperature of 800° C. or higher and a size of the Si crystallite is increased. The present invention is characterized in that the size of the Si crystallite is immeasurable, and the growth of c-Si is extremely suppressed. When the amorphous or microcrystalline silicon-based compound of the present invention is used, even in the case of performing the Li pretreatment under the same conditions, the growth of c-Si may be suppressed at a very high level, as compared with the silicon-based compound of a grown crystallite in the conventional art.

It is preferred to use a hydrocarbon gas having 3 or fewer carbon atoms as the hydrocarbon gas, since production costs are reduced and a good coating layer may be formed, but the present invention is not limited thereto.

Subsequently, the Li pretreatment process is performed. It is characterized in that the prepared silicon compound particles and the Li precursor are mixed and subjected to heat treatment to prepare negative electrode active material particles including a silicon oxide ($SiO_x$, 0<x≤2) and at least one lithium silicate selected from $Li_2SiO_3$, $Li_2Si_2O_5$, and $Li_4SiO_4$ in at least a part of the silicon oxide.

Specifically, it is preferred that the mixing of the silicon compound particles and the Li precursor is performed so that a Li/Si mole ratio is more than 0.3 and 1.0 or less, specifically more than 0.3 and 0.8 or less, preferably 0.4 to 0.8, and more preferably 0.5 to 0.8. Within the mixing range, an optimal ratio of $Li_2SiO_3$ and $Li_2Si_2O_5$ may be found, and formation of c-Si and $Li_4SiO_4$ may be suppressed to greatly improve electrochemical performance of a battery.

As the Li precursor, at least one or more selected from LiOH, Li, LiH, $Li_2O$, and $Li_2CO_3$ may be used, and the compound is not particularly limited as long as it may be decomposed during the heat treatment.

Subsequently, the compound may be heat-treated at higher than 500° C. and lower than 700° C. for 1 to 12 hours under an inert atmosphere. When the heat treatment is performed at a temperature of 700° C. or higher, a disproportionation reaction occurs or the growth of a Si crystal is accelerated, so that the growth of c-Si is inevitable, and when a raw material is prepared at a temperature of lower than 700° C., crystal growth is suppressed to make it possible to prepare amorphous or microcrystalline silicon oxide particles. In addition, the heat treatment is performed at a low temperature of lower than 500° C., the effect of the lithium pretreatment is rapidly decreased, so that the effect of suppressing crystal phase growth of the silicon oxide particles by the heat treatment at a low temperature according to the present invention is not shown. Meanwhile, in the Li pretreatment by an electrochemical method or an oxidation-reduction method, $Li_4SiO_4$ is likely to be produced as the lithium silicate, but according to the present invention, a target lithium silicate having a different composition may be synthesized at a high purity by the heat treatment.

Meanwhile, for the inert atmosphere, a known method in which the inside of a reaction unit is purged with inert gas to create the inert atmosphere may be applied, and the inert gas may be selected from Ne, Ar, Kr, $N_2$, and the like, preferably may be Ar or $N_2$, but the present invention is not limited thereto.

Subsequently, the heat treatment product is recovered and pulverized to prepare the negative electrode active material including the final negative electrode active material particles, but the present invention is not limited thereto. Any known pulverization may be applied as the pulverization process, but the present invention is not limited thereto.

Another embodiment provides a negative electrode for a lithium secondary battery including: a current collector; and a negative electrode active material layer including the negative electrode active material and a water-based binder positioned on the current collector.

The current collector may be selected from the group consisting of a copper foil, a nickel foil, a stainless steel foil, a titanium foil, a nickel foam, a copper foam, a polymer substrate coated with a conductive metal, and a combination thereof, but is not limited thereto.

The negative electrode active material layer includes the negative electrode active material and the water-based binder, and optionally, may further include a conductive material.

The negative electrode active material includes the negative electrode active material particles including: the silicon oxide ($SiO_x$, 0<x≤2); and at least one lithium silicate selected from $Li_2SiO_3$, $Li_2Si_2O_5$, and $Li_4SiO_4$ in at least a part of the silicon oxide, and optionally, may further include a material which may reversibly intercalate/deintercalate a lithium ion, a lithium metal, an alloy of a lithium metal, a material which may be doped or dedoped with lithium, or a transition metal oxide.

The negative electrode active material particles are as described above.

Examples of the material which may reversibly intercalate/deintercalate the lithium ion include a carbon material, that is, a carbon-based negative electrode active material which is commonly used in the lithium secondary battery. Representative examples of the carbon-based negative electrode active material include crystalline carbon, amorphous carbon, or a combination thereof. Examples of the crystalline carbon include graphite such as amorphous, plate-shaped, flake-shaped, spherical, or fibrous natural graphite or artificial graphite, and examples of the amorphous carbon include soft carbon or hard carbon, a mesophase pitch carbide, calcined coke, and the like.

The alloy of the lithium metal may be an alloy of lithium with a metal selected from the group consisting of Na, K, Rb, Cs, Fr, Be, Mg, Ca, Sr, Si, Sb, Pb, In, Zn, Ba, Ra, Ge, Al, and Sn.

The material which may be doped and dedoped with lithium may be a silicon-based material, for example, Si, $SiO_x$ (0<x≤2), a Si-Q alloy (Q is an element selected from the group consisting of alkali metals, alkali earth metals, Group 13 elements, Group 14 elements, Group 15 elements, Group 16 elements, transition metals, rare-earth elements, and combinations thereof, and is not Si), a Si-carbon composite, Sn, $SnO_2$, a Sn—R alloy (R is an element selected from the group consisting of alkali metals, alkali earth metals, Group 13 elements, Group 14 elements, Group 15 elements, Group 16 elements, transition metals, rare-earth elements, and combinations thereof, and is not Si), a Sn-carbon composite, and the like, and also, a mixture of at least one thereof and $SiO_2$ may be used. The elements Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide may be a lithium titanium oxide.

In the negative electrode active material, the negative electrode active material particles may be included at 50 wt % or more, preferably 60 wt % or more or 70 wt % or more, more preferably 80 wt % or more or 90 wt % or more, and as an example, 100 wt % with respect to the total weight of the negative electrode active material.

The water-based binder serves to adhere negative electrode active material particles to each other and to attach the negative electrode active material to the current collector well. The water-based binder may be polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated-EPDM, styrene-butadiene rubber (SBR), fluorine rubber, various copolymers thereof, and the like, and specifically, the binder may include a binder formed of carboxymethyl cellulose (CMC), styrene-butadiene rubber (SBR), and a mixture thereof.

The conductive material is used for imparting conductivity to an electrode and any conductive material may be used as long as it is an electroconductive material without causing a chemical change in the battery to be configured. Examples of the conductive material include carbon-based materials such as natural graphite, artificial graphite, carbon black, acetylene black, ketjen black, and carbon fiber; metal-based materials such as metal powder or metal fiber of copper, nickel, aluminum, silver, and the like; conductive polymers such as a polyphenylene derivative; or a mixture thereof.

Each of the contents of the binder and the conductive material in the negative electrode active material layer may be 1 to 10 wt %, preferably 1 to 5 wt % with respect to the total weight of the negative electrode active material layer, but is not limited thereto.

Another embodiment provides a lithium secondary battery includes: the negative electrode; a positive electrode; a separator positioned between the negative electrode and the positive electrode; and an electrolyte.

The negative electrode is as described above.

The positive electrode includes a positive electrode active material layer formed by applying a positive electrode slurry including a positive electrode active material on the current collector.

The current collector may be a negative electrode current collector described above, and any known material in the art may be used, but the present invention is not limited thereto.

The positive electrode active material layer includes the positive electrode active material, and optionally, may further include a binder and a conductive material. The positive electrode active material may be any known positive electrode active material in the art, and for example, it is preferred to use a composite oxide of lithium with a metal selected from cobalt, manganese, nickel, and a combination thereof, but the present invention is not limited thereto.

The binder and the conductive material may be a binder and a negative electrode conductive material described above, and any known material in the art may be used, but the present invention is not limited thereto.

The separator may be selected from glass fiber, polyester, polyethylene, polypropylene, polytetrafluoroethylene, or a combination thereof, and may be a nonwoven or woven form. For example, a polyolefin-based polymer separator such as polyethylene or polypropylene may be mainly used in the lithium secondary battery, a separator coated with a composition including a ceramic component or a polymer material for securing thermal resistance or mechanical strength, optionally, a single layer or a multilayer structure may be used, and any known separator in the art may be used, but the present invention is not limited thereto.

The electrolyte includes an organic solvent and a lithium salt.

The organic solvent serves as a medium in which ions involved in the electrochemical reaction of the battery may move, and for example, carbonate-based, ester-based, ether-based, ketone-based, alcohol-based, or aprotic solvents may be used, the organic solvent may be used alone or in combination of two or more, and when used in combination of two or more, a mixing ratio may be appropriately adjusted depending on battery performance to be desired. Meanwhile, any known organic solvent in the art may be used, but the present invention is not limited thereto.

The lithium salt is dissolved in the organic solvent and acts as a source of the lithium ion in the battery to allow basic operation of the lithium secondary battery and is a material which promotes movement of lithium ions between a positive electrode and a negative electrode. Examples of the lithium salt include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), $LiCl$, $LiI$, $LiB(C_2O_4)_2$, or a combination thereof, but the present invention is not limited thereto.

A concentration of the lithium salt may be in a range of 0.1 M to 2.0 M. When the lithium salt concentration is within the range, the electrolyte has appropriate conductivity and viscosity, so that the electrolyte may exhibit excellent electrolyte performance and lithium ions may effectively move.

In addition, the electrolyte may further include pyridine, triethyl phosphate, triethanolamine, cyclic ether, ethylene diamine, n-glyme, hexaphosphate triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol, aluminum trichloride, and the like, if necessary, for improving charge/discharge characteristics, flame retardant characteristics, and the like. In some cases, a halogen-containing solvent such as carbon tetrachloride and ethylene trifluoride may be further included for imparting non-flammability, and fluoro-ethylene carbonate (FEC), propene sulfone (PRS), fluoro-propylene carbonate (FPC), and the like may be further included for improving conservation properties at a high temperature.

The method of producing a lithium secondary battery according to the present invention for achieving the above object may include laminating the produced negative electrode, separator, and positive electrode in this order to form an electrode assembly, placing the produced electrode assembly in a cylindrical battery case or an angled battery case, and then injecting an electrolyte. Otherwise, the lithium secondary battery may be produced by laminating the electrode assembly and immersing the assembly in the electrolyte to obtain a resultant product which is then placed in a battery case and sealed.

As the battery case used in the present invention, those commonly used in the art may be adopted, there is no limitation in appearance depending on the battery use, and for example, a cylindrical shape, an angled shape, a pouch shape, a coin shape, or the like using a can may be used.

The lithium secondary battery according to the present invention may be used in a battery cell used as a power supply of a small device, and also may be preferably used as a unit cell in a medium or large battery module including a plurality of battery cells. Preferred examples of the medium or large device include an electric automobile, a hybrid electric automobile, a plug-in hybrid electric automobile, a system for power storage, and the like, but are not limited thereto.

Hereinafter, the preferred Examples and Comparative Examples of the present invention will be described. However, the following Examples are only a preferred exemplary embodiment of the present invention, and the present invention is not limited thereto.

EXAMPLES

Examples 1-1 to 1-7, and Comparative Examples 1-1 and 1-2

(Preparation of Silicon Compound Particles)

A raw material in which a silicon metal and silicon dioxide were mixed was introduced to a reaction furnace and evaporated in the atmosphere having a vacuum degree of 10 Pa to obtain a product, which was deposited on a suction plate and sufficiently cooled to take out a deposit, which was pulverized with a ball mill. In the thus-obtained silicon compound particles, x of $SiO_x$ was 1.0. Continuously, a particle diameter of the silicon compound particles was adjusted by classification. Thereafter, pyrolysis CVD was performed to coat a carbon material on a surface of the silicon compound particles. An average thickness of the carbon material was 100 nm. The prepared silicon compound was SiO particles having an average particle diameter (D50) of 8 μm. Here, (1) the temperature of the reaction furnace (heat treatment temperature) and the heat treatment time in preparation of the silicon compound particles, and (2) the temperature of the reaction furnace (heat treatment temperature) and the heat treatment time in coating of the carbon material on the surface of the silicon compound particles were performed as summarized in Example 1-1 of the following Table 4.

(Preparation of Negative Electrode Active Material)

The prepared silicon compound particles and LiOH powder were mixed to form mixed powder, the mixed powder and a zirconia ball (1-20 times the mixed powder) were placed in an airtight container, and shaking and mixing were performed for 30 minutes using a shaker. Thereafter, the mixed powder was filtered using a sieve of 25-250 μm and then placed in an alumina crucible.

The aluminum crucible was heat-treated in a furnace under a nitrogen gas atmosphere for 1-12 hours. Subsequently, the heat-treated powder was recovered and pulverized in a mortar to prepare negative electrode active material particles including a silicon oxide ($SiO_x$) and a lithium silicate (such as $Li_2Si_2O_5$ and $Li_2SiO_3$). Here, the heat treatment temperature in preparation of the negative electrode active material particles and a Li/Si mole ratio in mixing the silicon compound and the LiOH powder are summarized in the following Tables 1 and 2.

100 wt % of the prepared negative electrode active material particles were used with respect to the total weight of the negative electrode active material to prepare a negative electrode active material.

(Production of Negative Electrode)

The prepared negative electrode active material, a conductive material, carbon black (super P), and a water-based binder (polyacrylic acid) were dispersed at a weight ratio of 8:1:1 in an aqueous solution, applied on a Cu foil, and dried in vacuo at 80-160° C. for 1-24 hours to produce a negative electrode.

(Production of Half Battery)

The produced negative electrode and a lithium metal as a counter electrode were used, a PE separator was interposed between the negative electrode and the counter electrode, and an electrolyte was injected to assembly a coin cell (CR2032). The assembled coin cell was paused at room temperature for 3-24 hours to produce a half battery. Here, the electrolyte was obtained by mixing a lithium salt 1.0 M $LiPF_6$ with an organic solvent (EC:EMC=3:7 vol %) and mixing an electrolyte additive FEC 2 vol %.

Evaluation Example

1. Analysis of Crystallinity of Negative Electrode Active Material Particles by Raman Spectrum Analysis For Raman spectrum analysis, an Invia confocal Raman microscope available from Renishaw (UK) was used, and the surface of the particles was measured 8 times in a range of 67-1800 $cm^{-1}$ in a static mode at a laser wavelength of 532 nm at a lens magnification of 50 times, and the average value thereof was applied.

Meanwhile, in the analysis method of Raman spectrum, a region of 515±15 $cm^{-1}$ or more may be defined as a region of crystalline Si (c-Si), and a region thereof or less may be defined as a mixed region of amorphous Si (a-Si) derived from an amorphous silicon oxide ($SiO_x$) and amorphous Si from a lithium silicate. The evaluation results are shown in the following Table 1.

2. Analysis of Lithium Silicate Composition Formed in Silicon Oxide Particles by X-Ray Diffraction Analysis Method For XRD analysis, an Empyrean XRD diffractometer available from PANalytical was used, and measurement was performed by applying a current of 40 mA with a voltage of 45 kV. Analysis of each phase was performed by comparison with JCPDS card No. 98-002-9287 (Si), 98-002-8192 ($Li_2SiO_3$), 98-028-0481 ($Li_2Si_2O_5$), 98-003-5169 ($Li_4SiO_4$). From the obtained results, peak positions of (111) of Si positioned at 28.4±0.3°, (111) of $Li_2Si_2O_5$ positioned at 24.9±0.3°, and (111) of $Li_2SiO_3$ positioned at 26.9±0.3° were confirmed. The thus-obtained peak was subjected to deconvolution to determine an area C corresponding to (111) of Si, an area D corresponding to (111) of $Li_2Si_2O_5$, and an area E corresponding to (111) of $Li_2SiO_3$, respectively, and determine an area ratio.

The evaluation results are shown in the following Table 2.

3. Analysis of Si Crystalline Size of Silicon Compound by X-Ray Diffraction Analysis Method For XRD analysis, an Empyrean XRD diffractometer available from PANalytical was used, and measurement was performed by applying a current of 40 mA with a voltage of 45 kV. Specifically, a half-band width of a diffraction peak caused by a Si (111) crystal face (2θ=28.4±0.3°) was obtained by X-ray diffraction using a Cu-Kα ray. The size of the Si crystalline was analyzed using a Scherrer's equation.

Scherrer Equation: $\tau=(K\lambda)/(\beta \cos \delta)$

K: dimensionless shape factor, 0.9

λ: X-ray wavelength, 0.1540598 nm

β: full width at half maximum

θ: Bragg angle

4. Evaluation of Electrochemical Properties (Initial Discharge Capacity, Initial Efficiency, and Life Characteristic)

The produced half battery was charged at a constant current at a current of 0.1 C rate at room temperature (25° C.) until a voltage reached 0.01 V (vs. Li), and then was cut-off at a current of 0.01 C rate while maintaining 0.01 V to be charged at a constant voltage. The battery was discharged at a constant current of 0.1 C rate until the voltage reached 1.5 V (vs. Li). The charge and discharge were set as one cycle, one more cycle of charge and discharge was identically performed, and then 50 cycles in which the applied current was changed to 0.5 C during charge and discharge was performed, with a pause of 10 minutes between the cycles.

An initial discharge capacity, initial efficiency, and a life characteristic as a capacity retention rate (%) which is a discharge capacity for 50 cycles to a discharge capacity for one cycle were measured, and the results are summarized in the following Tables 1 and 2.

TABLE 1

| | Li pretreatment conditions | | Raman spectrum analysis | | | | |
|---|---|---|---|---|---|---|---|
| | Li/Si mole ratio | Heat treatment temperature (°C.) | Peak intensity ratio (Ia/Ib) | Maximum peak position (cm$^{-1}$) | Discharge capacity (mAh/g) | Initial efficiency (%) | Life characteristic (%) |
| Comparative Example 1-1 | 0.25 | 600 | 0.29 | 460 | 1451 | 79.2 | 28.2 |
| Example 1-1 | 0.33 | 600 | 0.33 | 468 | 1394 | 83.4 | 33.4 |
| Example 1-2 | 0.50 | 600 | 0.31 | 471 | 1300 | 84.7 | 40.3 |
| Example 1-3 | 0.67 | 600 | 0.30 | 496 | 1269 | 88.2 | 61.1 |
| Comparative Example 1-2 | 1.00 | 600 | 1.73 | 508 | 1127 | 89.2 | 15.0 |
| Example 1-4 | 0.50 | 550 | 0.25 | 466 | 1358 | 81.7 | 35.0 |
| Example 1-5 | 0.67 | 550 | 0.33 | 464 | 1360 | 89.5 | 84.0 |
| Example 1-6 | 0.75 | 550 | 0.30 | 461 | 1350 | 89.4 | 95.2 |
| Example 1-7 | 1.00 | 550 | 1.20 | 498 | 1241 | 89.1 | 79.2 |
| Reference 1 | — | — | 0.67 | 479 | 1613 | 74.2 | 9.0 |

Referring to Table 1, it is significant in that when Li pretreatment was performed, the negative electrode active material particles of Examples 1-1 to 1-5, which were prepared under the conditions of the present invention during the Li pretreatment, effectively formed a lithium silicate phase on a silicon oxide, and also, Raman spectrum analysis suggests that the growth of crystalline Si (hereinafter, referred to as c-Si) was suppressed, so that amorphous Si (hereinafter, referred to as a-Si) was formed at a high ratio.

Specifically, the negative electrode active material particles of Examples 1-1 to 1-6 may be controlled so that the maximum peak position by the Raman spectrum is in a range of more than 460 cm$^{-1}$ and less than 500 cm$^{-1}$, preferably 461 to 471 cm$^{-1}$, and the results show that the problem in which crystallization of SiO$_x$ particles proceeds during conventional Li pretreatment may be improved by suppressing the growth of c-Si to increase an a-Si ratio, as described above. As a result, it was confirmed that the battery characteristic was improved as compared with Comparative Examples 1-1 to 1-2.

In Comparative Example 1-2, it is analyzed that the lithium precursor was mixed at an excessively high content during the Li pretreatment, so that the growth of c-Si was not sufficiently suppressed. Example 1-7 stayed in an amorphous region, which means that the heat treatment temperature was relatively low as compared with Comparative Example 1-2 to suppress the growth of the crystallite.

However, in Comparative Example 1-1, an excessively low content of the lithium precursor was mixed, and as a result, the Li pretreatment was not sufficiently performed and the initial efficiency and the life characteristic were deteriorated.

In addition, in Examples 1-3 and 1-5, mixing ratios of the Li precursor were identical, but the crystallinity of Si at a level of 600° was increased and the life characteristic was not improved much, and in Example 1-5, an amorphous or microcrystalline negative electrode active material was obtained at a lower temperature than that in Example 1-3, and optimal capacity and efficiency were shown.

In the case of Reference 1, the maximum peak was as high as 479 cm$^{-1}$ as compared with Examples 1-1, 1-2, and 1-4 to 1-6, and Comparative Example 1-1, which does not mean that the crystallinity was high as compared with Examples 1-1, 1-2, and 1-4 to 1-6, and Comparative Example 1-1, and may be construed as a typical signal of the amorphous or microcrystalline SiO$_x$ including no lithium silicate. Therefore, when a lithium silicate is included by the Li pretreatment, it should be construed as being that the maximum peak may shift to a lower wavelength range as in Table 1.

Thus, it was found that only when an appropriate ratio of the Li precursor to the SiO$_x$ active material and temperature setting are involved, the negative electrode active material having suppressed formation of crystalline Si may be obtained.

TABLE 2

| | Li pretreatment conditions | | | | | | | |
|---|---|---|---|---|---|---|---|---|
| | Li/Si mole ratio | Heat treatment temperature (°C.) | Si/Li$_2$SiO$_3$ (C/E) | Si/Li$_2$Si$_2$O$_5$ (C/D) | Li$_2$Si$_2$O$_5$/Li$_2$SiO$_3$ (D/E) | Discharge capacity (mAh/g) | Initial efficiency (%) | Life characteristic (%) |
| Comparative Example 1-1 | 0.25 | 600 | 1.35 | 0.24 | 5.54 | 1451 | 79.2 | 28.2 |
| Example 1-1 | 0.33 | 600 | 1.09 | 0.48 | 2.26 | 1394 | 83.4 | 33.4 |
| Example 1-2 | 0.50 | 600 | 0.60 | 1.12 | 0.54 | 1300 | 84.7 | 40.3 |
| Example 1-3 | 0.67 | 600 | 0.76 | 4.69 | 0.16 | 1269 | 88.2 | 61.1 |
| Comparative Example 1-2 | 1.00 | 600 | 8.75 | 45.99 | 0.19 | 1127 | 89.2 | 15.0 |
| Example 1-4 | 0.50 | 550 | 0.22 | 0.67 | 0.33 | 1358 | 81.7 | 35.0 |
| Example 1-5 | 0.67 | 550 | 0.26 | 8.40 | 0.03 | 1360 | 89.5 | 84.0 |
| Example 1-6 | 0.75 | 550 | 0.34 | 7.51 | 0.05 | 1350 | 89.4 | 95.2 |
| Example 1-7 | 1.00 | 550 | 0.42 | 8.33 | 0.05 | 1241 | 89.1 | 79.2 |
| Reference 1 | — | — | — | — | — | 1613 | 74.2 | 9.0 |

Referring to Table 2, when the Li pretreatment was performed, the negative electrode active material particles of Examples 1-1 to 1-7 prepared under the conditions of the present invention may suppress the growth of crystalline Si (hereinafter, referred to as c-Si) to form amorphous Si (hereinafter, referred to as a-Si) at a high ratio, and also, may promote formation of $Li_2SiO_3$ in which a smaller amount of Si is consumed relative to a $Li^+$ ion than a lithium silicate such as $Li_2Si_2O_5$, and thus, they are effective in terms of initial efficiency and a life characteristic.

Meanwhile, in Comparative Example 1-2, when the Li pretreatment was performed, a mixing amount of the lithium precursor was somewhat large and the heat treatment temperature was raised, $Li_2SiO_3$ was formed at a high ratio but the growth of c-Si was promoted, so that the life characteristic was not good.

Referring to Tables 1 and 3, it was confirmed that when the Li pretreatment was performed, c-Si and $Li_4SiO_4$ phases were easily formed under the conditions of an excessive amount of the Li precursor, and as described above, c-Si may deteriorate the life characteristic and has high reactivity to moisture in the presence of the $Li_4SiO_4$ phase to make it difficult to adjust the physical properties of a slurry in the electrode manufacture, which is thus not preferred.

In addition, as seen from Examples 1-4 to 1-7, even when the ratio of the Li precursor was excessive, formation of c-Si and the $Li_4SiO_4$ phase may be suppressed when the temperature is lowered, but when a certain content was exceeded, the effect of suppressing c-Si and $Li_4SiO_4$ phase production may be reduced.

Examples 2-1, and Comparative Examples 2-1 to 2-6

Negative electrode active material particles were prepared in the same manner as in Example 1-1, except that the preparation of the silicon compound particles and coating the surface with a carbon layer were performed under the conditions described in Table 4. Here, (1) the heat treatment temperature and the heat treatment time in the preparation of the silicon compound particles and the crystallite size of the prepared silicon compound particles, (2) the heat treatment temperature and the heat treatment time when the surface of the silicon compound particles with a carbon material, and a crystallite size of the prepared product, and (3) the Raman spectrum maximum peak position of the Li-pretreated negative electrode active material particles are summarized in the following Table 4.

TABLE 3

| | Content of lithium silicate | |
| --- | --- | --- |
| | Content (wt %) of lithium silicate to total weight of negative electrode active material particles | Content (wt %) of $Li_4SiO_4$ relative to total weight of lithium silicate |
| Comparative Example 1-1 | 64 | 0 |
| Example 1-1 | 79 | 0 |
| Example 1-2 | 87 | 0 |
| Example 1-3 | 82 | 0 |
| Comparative Example 1-2 | 34 | 35 |
| Example 1-4 | 84 | 0 |
| Example 1-5 | 81 | 0 |
| Example 1-6 | 57 | 0 |
| Example 1-7 | 42 | 24 |

TABLE 4

| | $SiO_x$ base material | | | Coating of carbon material on $SiO_x$ base material surface | | | Lithium pretreatment progress |
| --- | --- | --- | --- | --- | --- | --- | --- |
| | Heat treatment temperature (° C.) | Heat treatment time (h) | Si crystallite size (nm) | Heat treatment temperature (° C.) | Heat treatment tine (h) | Si crystallite size (nm) | Ramen spectrum maximum peak position (cm$^{-1}$) |
| Example 1-1 | 600 | 1~12 | immeasurable | 600 | 1~3 | immeasurable | 470 |
| Example 2-1 | 600 | 1~12 | immeasurable | 600 | 4~6 | immeasurable | 474 |
| Comparative Example 2-1 | 900 | 1~4 | 8 | No coating progress | | 8 | 518 |
| Comparative Example 2-2 | 1200 | 1~3 | 21 | No coating progress | | 21 | 521 |
| Comparative Example 2-3 | 800 | 2~5 | 5.7 | 800 | 1~3 | 8 | 516 |
| Comparative Example 2-4 | 800 | 2~5 | 5.7 | 900 | 1~3 | 29 | 520 |
| Comparative Example 2-5 | 550 | 2~6 | immeasurable | 800 | 1~3 | 7.5 | 517 |
| Comparative Example 2-6 | 600 | 2~5 | immeasorable | 900 | 1~3 | 32 | 519 |

Referring to Table 4, in Examples 1-1 and 2-1, since the heat treatment conditions were adjusted during preparation of the $SiO_x$ base material and coating of the surface with a carbon material, the Si crystallite size may be effectively controlled. However, in Comparative Examples 2-1, 2-2, 2-3, 2-4, 2-5, and 2-6, it was found that the Si crystallite size was formed high. Thus, though the Li pretreatment heat treatment conditions were adjusted in the range of the present invention, it was confirmed that the formation of c-Si was not suppressed from the analysis results of the Raman spectrum of the negative electrode active material particles. The above results suggest that in order to suppress the growth of c-Si of the $SiO_x$ negative electrode active material particles, the Si crystallite size of a $SiO_x$ base material or carbon material-coated SiO as a Li pretreatment raw material should be controlled to a very low level.

Examples 3-1 to 3-5, and Comparative Examples 3-1 to 3-5

Half batteries of Examples 3-1 to 3-5, and Comparative Examples 3-1 to 3-5 were produced in the same manner as in Example 1-4 and Comparative Example 1-1, respectively, except that the negative electrode active material having a configuration (weight ratio) of natural graphite:negative electrode active material particles ($SiO_x$ particles) of the following Table 5 was prepared.

TABLE 5

|  | Natural graphite:$SiO_x$ particles (weight ratio) | Discharge capacity (mAh/g) | Initial efficiency (%) | Life characteristic (%) |
| --- | --- | --- | --- | --- |
| Example 3-1 | 5:5 | 860 | 92.1 | 90.2 |
| Example 3-2 | 4:6 | 958 | 91.5 | 88.8 |
| Example 3-3 | 3:7 | 1063 | 91.1 | 87.4 |
| Example 3-4 | 2:8 | 1162 | 90.6 | 86.1 |
| Example 3-5 | 1:9 | 1267 | 90.2 | 85.2 |
| Comparative Example 3-1 | 5:5 | 902 | 86.8 | 58 |
| Comparative Example 3-2 | 4:6 | 1013 | 85.3 | 48 |
| Comparative Example 3-3 | 3:7 | 1117 | 83.5 | 42 |
| Comparative Example 3-4 | 2:8 | 1220 | 82.0 | 36 |
| Comparative Example 3-5 | 1:9 | 1324 | 80.8 | 33 |

Referring to Tables 1 and 2, when the negative electrode active material, which had an excellent life characteristic of 84.0% with the material of Example 1-4 alone, was applied as in Examples 3-1 to 3-5, severe life deterioration was not observed even when an excessive amount of $SiO_x$ was added. This means that a volume change of $SiO_x$ was suppressed during charge and discharge so that deterioration of graphite was not accelerated.

In Comparative Examples 3-1 to 3-5 to which Comparative Example 1-1 was applied, it was found that even with mixing of $SiO_x$ having a large volume change during charge and discharge and graphite having a relatively good volume change, electrode deterioration due to a rapid volume change of $SiO_x$ occurred so that the life characteristic was decreased below expectation.

5. Analysis of Crystallinity of Surface and Cross Section of Negative Electrode Active Material Particles by Raman Spectrum Analysis (Electrode Raman Results of Example 1-5)

A negative electrode was produced in the same manner as in Example 1-5, except that the negative electrode active material having a weight ratio of natural graphite:negative electrode active materials ($SiO_x$ particles) of 5:5 was prepared. Analysis of a Raman spectrum of the surface and a cross section was performed on a fresh negative electrode (Examples 1-5-1 and 1-5-2) which did not undergo an electrochemical reaction) and a negative electrode (Examples 1-5-3 and 1-5-4) after one cycle of charge and discharge, and the results are shown in the following Table 6.

Meanwhile, one cycle of charge and discharge was performed under the conditions of CC charge (0.1 C, 0.01 V cut-off), CV charge (0.01 V, 0.01 C cut-off), and CC discharge (0.1 C, 1.5 V cut-off), an Invia confocal Raman microscope available from Renishaw (UK) was used for Raman spectrum analysis, and the surface and the cross section of the negative electrode were measured 8 times in a range of 67-1800 $cm^{-1}$ in a static mode at a laser wavelength of 532 nm at a lens magnification of 50 times, and the average value thereof was applied.

TABLE 6

|  | Raman spectrum analysis | | | |
| --- | --- | --- | --- | --- |
|  | Peak intensity ratio (Ia/Ib) | Maximum peak position ($cm^{-1}$) | D band | G band |
| Example 1-5 | 0.33 | 464 | — | — |
| Example 1-5-1 (Fresh, surface) | 0.37 | 470 | 1343 | 1572 |
| Example 1-5-2 (Fresh, cross section) | 0.23 | 454 | 1343 | 1586 |
| Example 1-5-3 (1 cycle, surface) | 0.41 | 456 | 1343 | 1577 |
| Example 1-5-4 (1 cycle, cross section) | 0.28 | 472 | 1346 | 1575 |

Referring to Table 6, in the Raman spectrum analysis of the surface and the cross section of the negative electrodes of Examples 1-5-1 to 1-5-4, a D-band was confirmed at 1340 $cm^{-1}$ to 1350 $cm^{-1}$, and a G-band was confirmed at 1570 $cm^{-1}$ to 1590 $cm^{-1}$. This may be explained by the D-band and G-band caused by the natural graphite active material and the carbon conductive material contained in the electrode.

In addition, from the results of analyzing the surface of the electrode, it was found that the position of the Raman maximum peak of the fresh electrode and the electrode after one cycle was at 450-480 $cm^{-1}$, which is similar to the results of the powder sample of Example 1-5.

It was also confirmed from the results of analyzing the cross section of the electrode that the Raman maximum peak position of the fresh electrode and the electrode after one cycle was at 450-480 $cm^{-1}$, which is also similar.

Figure 1:
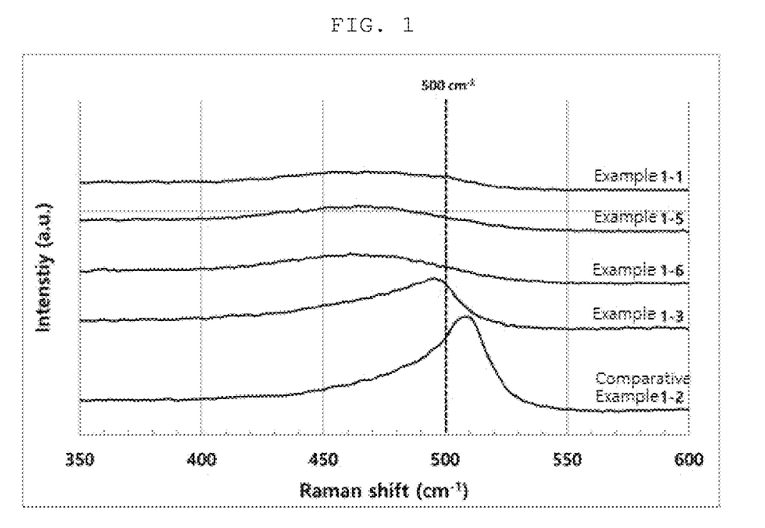
FIG. 1 is a graph of Raman spectrum analysis of Examples 1-1, 1-3, 1-5, and 1-6, and Comparative Example 1-2.
Figure 2:
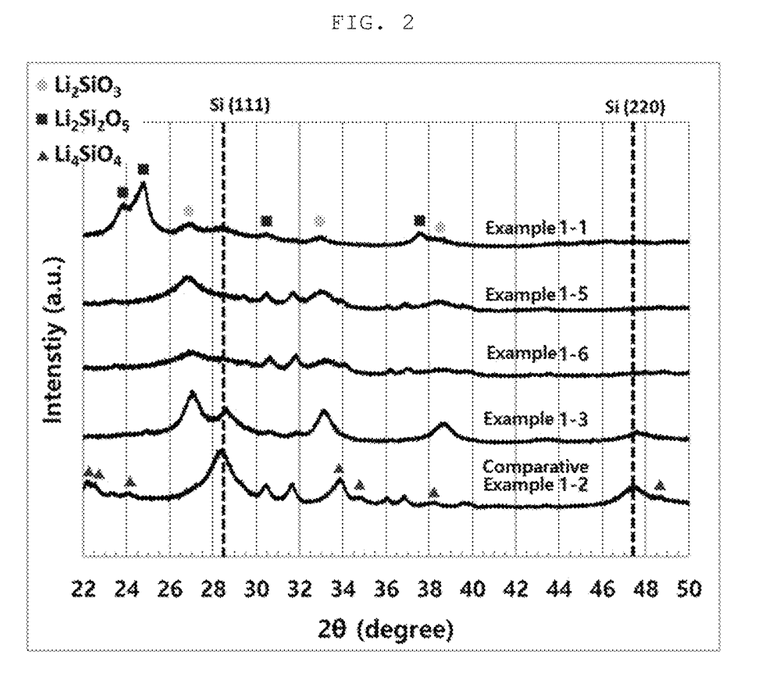
FIG. 2 is a graph of X-ray diffraction analysis of Examples 1-1, 1-3, 1-5, and 1-6, and Comparative Example 1-2.
Figure 3:
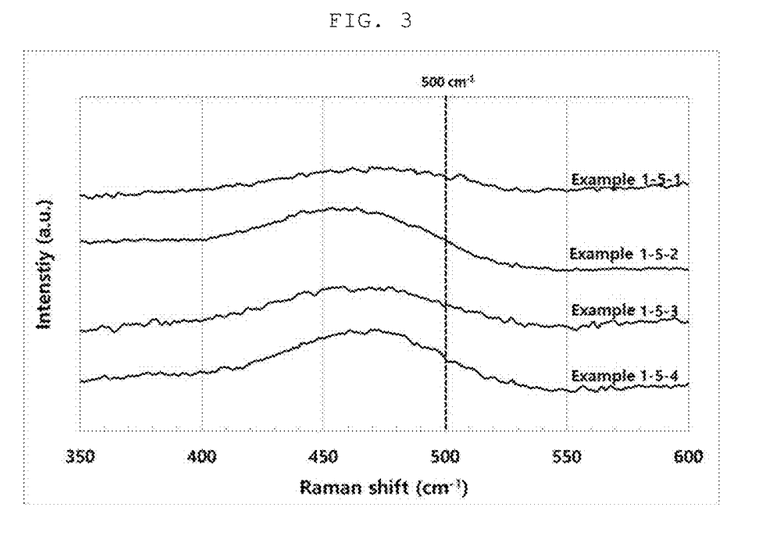
FIG. 3 is a graph of Raman spectrum analysis of a surface and a cross section of negative electrodes produced in Examples 1-5-1 to 1-5-4.

Referring to Table 6 and FIG. 3, the maximum peak position is at an amorphous region even when the cycle was progressed with an electrode produced by a sample prepared at less than 500 $cm^{-1}$ as the electrode. In addition, the peak intensity ratio Ia/Ib was also measured as 1.2 or less, which is the optimal condition mentioned above, and thus, it was confirmed that there was no change such as material crystallization and a non-crystalline state was maintained well.

Expansion of silicon-based oxide particles may be suppressed to improve battery stability and a life characteristic, and Li pretreatment on the silicon-based oxide may be performed to solve an initial efficiency deterioration problem.

In addition, the Li pretreatment may be performed under specific conditions to improve energy costs during the Li pretreatment, and a ratio of a specific phase of a lithium silicate formed may be adjusted to optimize a capacity characteristic.

In addition, since the problem of the initial efficiency of the silicon oxide is improved by the Li pretreatment, a problem in which crystallinity of the silicon-based oxide is correspondingly increased (increase in a c-Si/a-Si ratio) arises, but this problem is solved by performing preparation of a raw material of a silicon oxide and the Li pretreatment under specific conditions, and as a result, electrochemical properties may be further improved.

Although the exemplary embodiments of the present invention have been described above, the present invention is not limited to the exemplary embodiments but may be made in various forms different from each other, and those skilled in the art will understand that the present invention may be implemented in other specific forms without departing from the spirit or essential feature of the present invention. Therefore, it should be understood that the exemplary embodiments described above are not restrictive, but illustrative in all aspects.

What is claimed is:

1. A negative electrode active material comprising:
   negative electrode active material particles including a silicon oxide ($SiO_x$, $0<x\leq2$) and at least one lithium silicate selected from $Li_2SiO_3$, $Li_2Si_2O_5$, and $Li_4SiO_4$ in at least a part of the silicon oxide,
   wherein the negative electrode active material particles have a maximum peak position by a Raman spectrum of more than 460 $cm^{-1}$ and less than 500 $cm^{-1}$, and
   wherein the negative electrode active material particles have a peak area ratio D/E according to an X-ray diffraction analysis method of less than 5.54 (D is an area of a $Li_2Si_2O_5$ peak positioned at 24.9±0.3", and E is an area of a $Li_2SiO_3$ peak positioned at 26.9±0.3" in X-ray diffraction analysis).

2. The negative electrode active material of claim 1, wherein the negative electrode active material particles have a maximum peak position by a Raman spectrum of 480 $cm^{-1}$ or less.

3. The negative electrode active material of claim 1, wherein the negative electrode active material particles have a peak intensity ratio Ia/Ib by the Raman spectrum of 1.20 or less, wherein Ia is a peak intensity of 515±15 $cm^{-1}$ and Ib is a peak intensity of 470±30 cm-1 in the Raman spectrum.

4. The negative electrode active material of claim 3, wherein the peak intensity ratio Ia/Ib by the Raman spectrum is 0.4 or less.

5. The negative electrode active material of claim 1, wherein the negative electrode active material particles include 10 wt % or more and less than 100 wt % of the lithium silicate with respect to a total weight.

6. The negative electrode active material of claim 1, wherein the negative electrode active material particles have a peak area ratio C/D according to the X-ray diffraction analysis method of less than 45.99, wherein C is an area of a Si peak positioned at 28.4±0.3°, and D is an area of a $Li_2Si_2O_5$ peak positioned at 24.9±0.3° in the X-ray diffraction analysis.

7. The negative electrode active material of claim 1, wherein the negative electrode active material particles have a peak area ratio C/E according to the X-ray diffraction analysis method of less than 8.75, wherein C is an area of a Si peak positioned at 28.4±0.3°, and E is an area of a $Li_2SiO_3$ peak positioned at 26.9±0.3° in the X-ray diffraction analysis.

8. The negative electrode active material of claim 7, wherein the peak area ratio C/E according to the X-ray diffraction analysis method is less than 1.1.

9. The negative electrode active material of claim 1, wherein the negative electrode active material particles include substantially no $Li_4SiO_4$.

10. The negative electrode active material of claim 1, wherein the negative electrode active material includes 50 wt % or more of the negative electrode active material particles with respect to the total weight.

11. A method of preparing the negative electrode active material of claim 1, the method comprising:
    preparing silicon compound particles; and
    mixing silicon compound particles and a Li precursor and performing heat treatment to prepare negative electrode active material particles including a silicon oxide ($SiO_x$, $0<x\leq2$) and at least one lithium silicate selected from $Li_2SiO_3$, $Li_2Si_2O_5$, and $Li_4SiO_4$ in at least a part of the silicon oxide,
    wherein the negative electrode active material particles have a maximum peak position by a Raman spectrum of more than 460 $cm^{-1}$ and less than 500 $cm^{-1}$.

12. A negative electrode comprising: a negative electrode active material layer including: the negative electrode active material of claim 1 and a water-based binder.

13. A lithium secondary battery comprising: the negative electrode of claim 12; a positive electrode; a separator positioned between the negative electrode and the positive electrode; and an electrolyte.

14. A negative electrode active material comprising:
    negative electrode active material particles including a silicon oxide ($SiO_x$, $0<x\leq2$) and at least one lithium silicate selected from $Li_2SiO_3$, $Li_2Si_2O_5$, and $Li_4SiO_4$ in at least a part of the silicon oxide,
    wherein the negative electrode active material particles have a maximum peak position by a Raman spectrum of more than 460 $cm^{-1}$ and less than 500 $cm^{-1}$, and
    wherein the negative electrode active material particles have a peak area ratio C/D according to the X-ray diffraction analysis method of less than 45.99 (C is an area of a Si peak positioned at 28.4±0.3°, and D is an area of a $Li_2Si_2O_5$ peak positioned at 24.9±0.3° in the X-ray diffraction analysis).

15. A negative electrode active material comprising:
    negative electrode active material particles including a silicon oxide ($SiO_x$, $0<x\leq2$) and at least one lithium silicate selected from $Li_2SiO_3$, $Li_2Si_2O_5$, and $Li_4SiO_4$ in at least a part of the silicon oxide,
    wherein the negative electrode active material particles have a maximum peak position by a Raman spectrum of more than 460 $cm^{-1}$ and less than 500 $cm^{-1}$, and wherein the negative electrode active material particles have a peak area ratio C/E according to the X-ray diffraction analysis method of less than 8.75 (C is an area of a Si peak positioned at 28.4±0.3°, and E is an area of a $Li_2SiO_3$ peak positioned at 26.9±0.3° in the X-ray diffraction analysis).

* * * * *

UNITED STATES PATENT AND TRADEMARK OFFICE
CERTIFICATE OF CORRECTION

PATENT NO. : 11,958,750 B2
APPLICATION NO. : 17/325294
DATED : April 16, 2024
INVENTOR(S) : Eunjun Park et al.

Page 1 of 1

It is certified that error appears in the above-identified patent and that said Letters Patent is hereby corrected as shown below:

In the Claims

Column 19, Line 43, Claim 1, delete "DIE" and insert -- D/E --

Column 19, Line 45, Claim 1, delete "0.3"," and insert -- 0.3°, --

Column 19, Line 46, Claim 1, delete "0.3"" and insert -- 0.3° --

Signed and Sealed this
Eleventh Day of June, 2024

Katherine Kelly Vidal
*Director of the United States Patent and Trademark Office*